(12) United States Patent
Keathley et al.

(10) Patent No.: US 6,474,173 B2
(45) Date of Patent: Nov. 5, 2002

(54) PRESSURE SENSITIVE PAINT SYSTEM CONTROL

(75) Inventors: James F. Keathley, Benbrook; Larry N. Lydick; Wendell M. Baker, II, both of Fort Worth, all of TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/790,173

(22) Filed: Feb. 21, 2001

(65) Prior Publication Data

US 2002/0112545 A1 Aug. 22, 2002

(51) Int. Cl.[7] ................................................. G01L 1/24
(52) U.S. Cl. ........................................... 73/800; 73/762
(58) Field of Search ........................... 73/762, 763, 774, 73/800

(56) References Cited

U.S. PATENT DOCUMENTS

| | | | |
|---|---|---|---|
| 5,304,809 A | * | 4/1994 | Wickersheim ............ 250/458.1 |
| 5,731,995 A | | 3/1998 | Benne et al. |
| 5,854,682 A | | 12/1998 | Gu |
| 6,327,030 B1 | * | 12/2001 | Ifju et al. .................... 356/32 |

FOREIGN PATENT DOCUMENTS

EP     0 558 771 A     9/1993

* cited by examiner

*Primary Examiner*—Max Noori
(74) *Attorney, Agent, or Firm*—Jackson Walker LLP (57) ABSTRACT

The present invention provides an apparatus, system and method which enables a determination of pressure on a surface which is coated with a pressure sensitive paint which, when flashed with light, exhibits return light with a decay time constant as a function of surface pressure. The system controls a light source which is adapted to emit a train of light pulses directed at the coated surface and controls a camera adapted to collect light level data from the surface. Further, a synchronizer is used to provide timing and control of the light source and the camera in which the synchronizer enables the light source and subsequently enables the camera to collect light level data in first and second gate periods. The first gate period is set to a predetermined time period associated with a light pulse and the second gate period is set to a predetermined time period subsequent to the first gate period. A decay time constant is determined from the data collected in the first gate period and the second gate period.

19 Claims, 12 Drawing Sheets

PRESSURE SENSITIVE PAINT SYSTEM CONTROL

BACKGROUND OF THE INVENTION

1. Technical Field of the Invention

The present invention relates to pressure mapping and, more particularly, to a method, apparatus and system of lifetime decay measurement pressure mapping.

2. Description of Related Art

Aerodynamic test data of surfaces, such as airfoils, are important for improving aerodynamic loading and for optimization of aerodynamic efficiency. Since, aerodynamic forces acting on an airfoil results largely from the distribution of pressure over the surface, airfoils and other aircraft components are commonly tested in wind tunnels to gather test data for use in verification of characteristics and in design improvements. It is common practice to measure surface pressures using a pressure model in a wind tunnel and compute the force distributions from the pressure data collected.

A number of techniques have been developed over the years to collect pressure measurements. A current technique is to build a pressure model having hundreds of small orifices or pressure taps machined into their surfaces. These small orifices must be drilled precisely normal to the surface with tight tolerances on location and diameter. Additionally, each pressure orifice must be connected to a pressure transducer device. The pressure taps communicate at one end with the pressure at the surface of the structure and at the other end with the pressure transducer.

Since there are usually too many orifices to leave room for the transducers inside the model, hundreds of thin tubes must be used to establish connection to the internally located transducers. Because of the spatial requirements, the number of sensors that can be used in this type of system is limited and, thus, the resolution of the measurements is also limited. Moreover, overall forces and moments cannot always be measured accurately with the above-mentioned technique, because of the poor spacial resolution. Lastly, utilizing pressure models with pressure taps is time consuming and expensive to build.

In another approach, mechanical or electrical pressure sensors can be affixed to the external surface of the pressure model to be tested. However, this approach exhibits many of the same shortcomings as the above-mentioned approach. The sensors are generally relatively large compared to the pressure model which limits the spacial resolution of data that can be gathered during the wind tunnel testing. Additionally, such sensors ordinarily extend above the surface of the model into the air stream which tends to alter the air stream and alter the measured values.

The field of pressure sensitive paint barometry has been developed in response to the difficulties arising from the above-described conventional techniques. Pressure sensitive paint barometry has developed as a result of the discovery that a surface may be coated with materials which are capable of being excited by light and which will emit light as a function of pressure which may be used as a measure of pressure on the surface. The coated material is made of an adhesive and an active agent, for example, that emits light when excited by radiation of a particular type, such as ultraviolet or visible blue light. For some types of active agents, the presence of oxygen, such as found in the air, quenches or reduces the light emission. It has been found that light output of some active agents is inversely proportional to the partial pressure of the oxygen. Therefore, the higher the pressure of oxygen in the atmosphere contacting the pressure sensitive paint, the lower the light emission of the paint.

Other pressure sensitive paints, when flashed with light, exhibit a returned or reflected light with a decay time constant which is a function of surface pressure disposed on a painted surface. However, these lifetime decay measurement systems require a plurality of exposures to capture enough light decay data to accurately compute surface pressure of a wind tunnel model.

Current methods requires that system components be manually set-up for each test image to capture exposures with different timing. Each exposure or test image requires programming a camera shutter for a specific instant of time subsequent to light exposure. Since wind tunnel test time is very expensive costing up to $10,000 per hour not including labor cost, extended manual setup time for multiple camera exposures is very expensive. The multiple programming and set-up is not only time consuming but also introduces inconsistent results. Current methods introduce as much as thirty percent error because of inadequate synchronization of a few microseconds between the camera equipment and the lighting equipment.

SUMMARY OF THE INVENTION

The present invention achieves technical advantages as an apparatus, system and method of determining surface pressure of a surface which is coated with a pressure sensitive paint which, when flashed with light, exhibits return light with a decay time constant as a function of surface pressure. The system controls a light source which is adapted to emit a train of light pulses directed at the coated surface and a camera adapted to collect light level data from the surface. Further, a synchronizer is used to provide timing and control of the light source and the camera in which the synchronizer enables the light source and subsequently enables the camera to collect light level data in a first gate period and a second gate period. The first gate period is set to a predetermined time period following a light pulse and the second gate period is set to a predetermined time period subsequent to the first gate period. A decay time constant is determined from the data collected in the first gate period and the second gate period.

Although the new advantages of the present invention are too numerous to discuss fully here, several advantages are of particular interest. First, the present invention synchronizes the electronic shutter of a digital camera to provide defined exposures with consistent flash numbers providing for the determination of more precise decay time constants. Second, the present invention also provides for higher productivity eliminating the need for operator set-up programming for each camera exposure, thus, allowing an operator to collect up to 10–20 times as many exposures as current methods, given the same amount of time. Additionally, the present invention offers an operator a high level of confidence that the equipment is operating properly by observing a proper sequence of events.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present applications will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1:
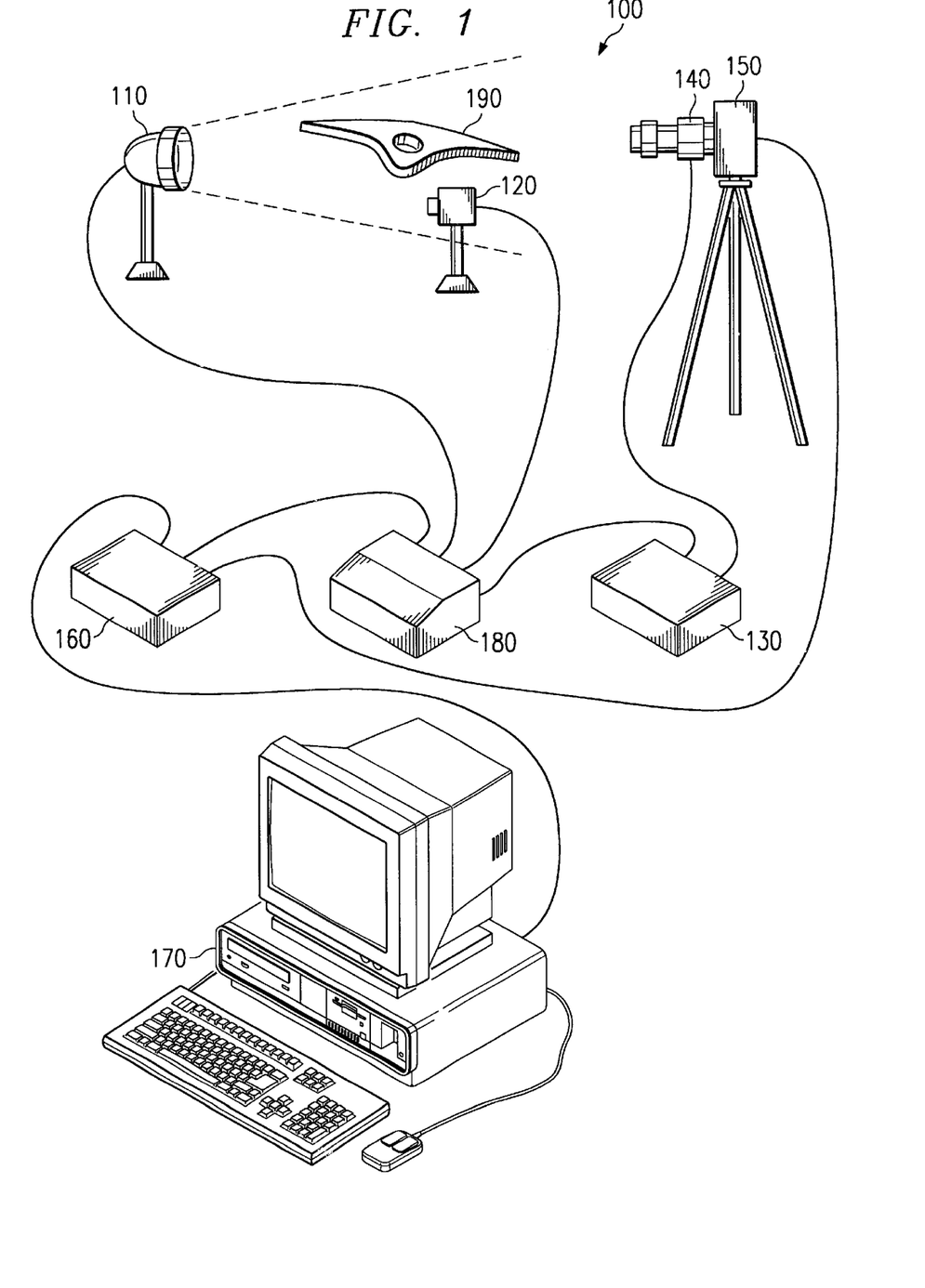
FIG. 1 illustrates a system interconnect diagram in accordance with the present invention.

Referring to FIG. 1 there is illustrated a preferred embodiment of a lifetime decay system 100 in accordance with the present invention. The system 100 includes a light source 110, photo detection device 120 for detecting light emitted from the light source 110, photo-intensifier device 140 with associated controller 130, light data collection device 150 (such as a camera) with associated controller 160, device for storing and processing 170 (such as a computer), and a system synchronizer 180 (hereinafter referred to as PixoMaster).

The light source 110 or Xenon Flash Lamp, for example, is used to emit a short duration flash (a few microseconds long) directed at a test model 190 which is disposed with a pressure sensitive paint or covering that, when flashed with light, exhibits a returned light with a decay time constant which is a function of surface pressure. Initiation of the light source 110 is controlled or triggered by a signal from the PixoMaster 180. In a preferred embodiment, the lamp flashes at least approximately 100 times per second for a few seconds. Other flashing devices known in the art, such as a Light-Emitting-Diode (LED) Array, can be used. LED Arrays can be flashed more than 1000 times per second. The duration and pulse timing of the flash is also controlled by a signal from the PixoMaster 180. For LED arrangements, the pulse timing and duration can be adjusted, for example, by setting switch arrays inside the PixoMaster 180. The photo detection device 120 can be a Photodiode, for example, which senses the light from the Xenon Flash Lamp or the LED Array and sends a signal to the PixoMaster 180 that determines the light source 110 is flashing and/or when the light flash has decayed sufficiently to start light decay measurements. The Photo Intensifier 140 is mounted between the camera body and the lens system serving to intensify low level light and act as a very fast (microsecond level) shutter. The Photo Intensifier 140 is controlled by the Photo Intensifier Controller 130, which is in turn controlled by the PixoMaster 180.

The PixoMaster 180 issues control signals to enable partial camera exposures for Gate 1 and Gate 2 time periods. The signals synchronize the shutter of the digital camera so the exposures consistently include the same number of flashes in each exposure. In a preferred embodiment, the camera is a commercial monochrome digital camera with 1024×1024 elements. Other cameras intended for scientific applications, accurate in measuring light levels can be used. In a preferred embodiment, a camera controller is used to assist in the control of the camera exposures. Signaling from/to the camera controller are also coordinated with the PixoMaster. The camera further downloads, to the computer, a 1024×1024 array of light intensity data for each exposure. In a preferred embodiment, the computer is a personal computer (PC). The PC stores the light intensity data on a hard drive or other memory element. Subsequent to receiving the light intensity data, the PC is also used to compute a decay time constant from which a determination of the surface pressure can be made. The PC also provides for a system operator interface.

Figure 2:
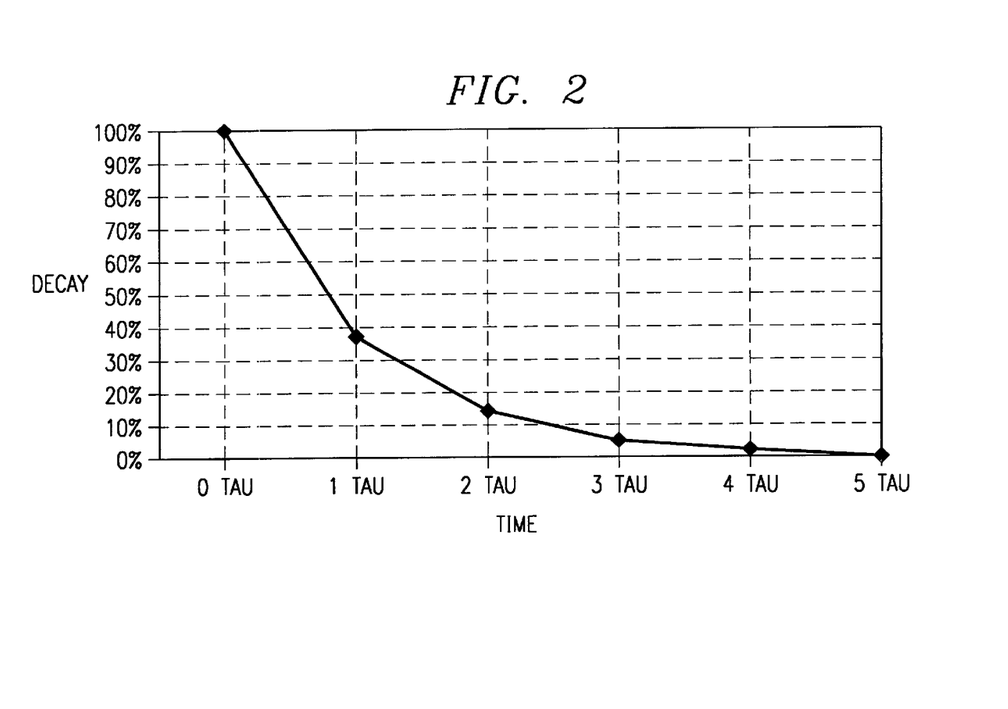
FIG. 2 illustrates a graph of decay time constant.

Referring now to FIG. 2 there is illustrated a graph of decay time constant. A Time Constant (often given the Greek symbol Tau) is the time for the value to decay to approximately 36 percent of its starting value. As can be seen, in two time constants (2 Tau), the value will decay to 0.367×0.367 (or 0.135) times the original value. In each subsequent time constant the value will be reduced by the multiplier 0.367.

Figure 3:
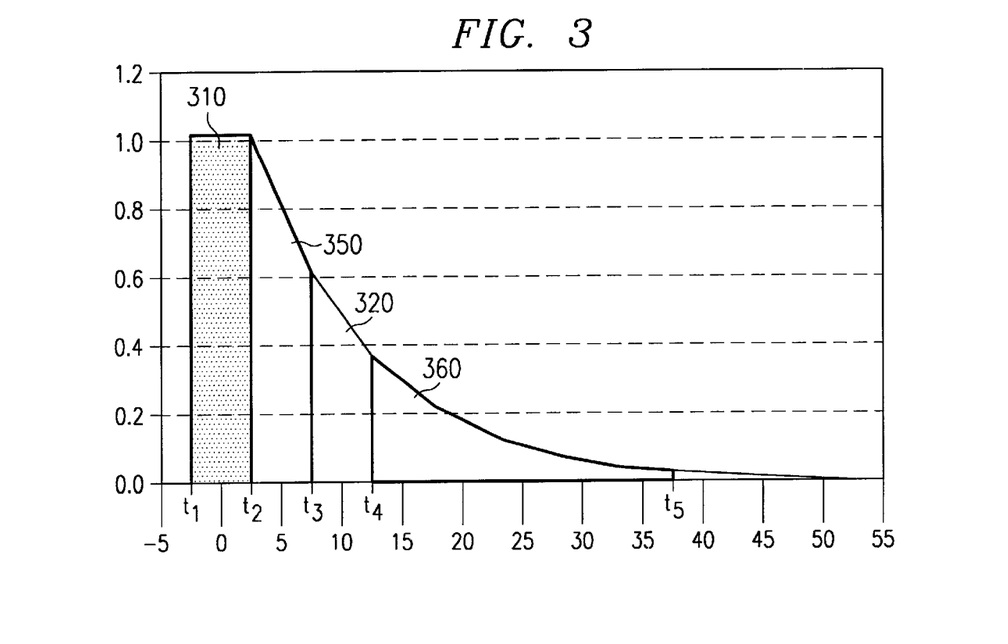
FIG. 3 illustrates an exposure sequence in accordance with the present invention.

Referring now to FIG. 3 there is illustrated an exposure sequence. The blackened area represents the period of the light flash 310 between time t1 and t2. The bordered area between time t2 and t3 indicates a camera partial exposure for a Gate 1 time period 350. The bordered area between time t4 and t5 indicates a camera partial exposure for a Gate 2 time period 360. This sequence is repeated many times (up to several thousand) within each camera exposure. For example, the camera shutter is opened for a plurality of strobes during Gate 1 periods 350 resulting in a Gate 1 exposure and the camera shutter is open for a plurality of strobes during GATE 2 periods 360 resulting in a Gate 2 exposure. With the Gate 1 and Gate 2 information, the light decay rate 320 (illustrated by the line between time t3 and t4), which is proportional to the pressure on the pressure sensitive painted surface, is mathematically calculated.

Figure 3A:
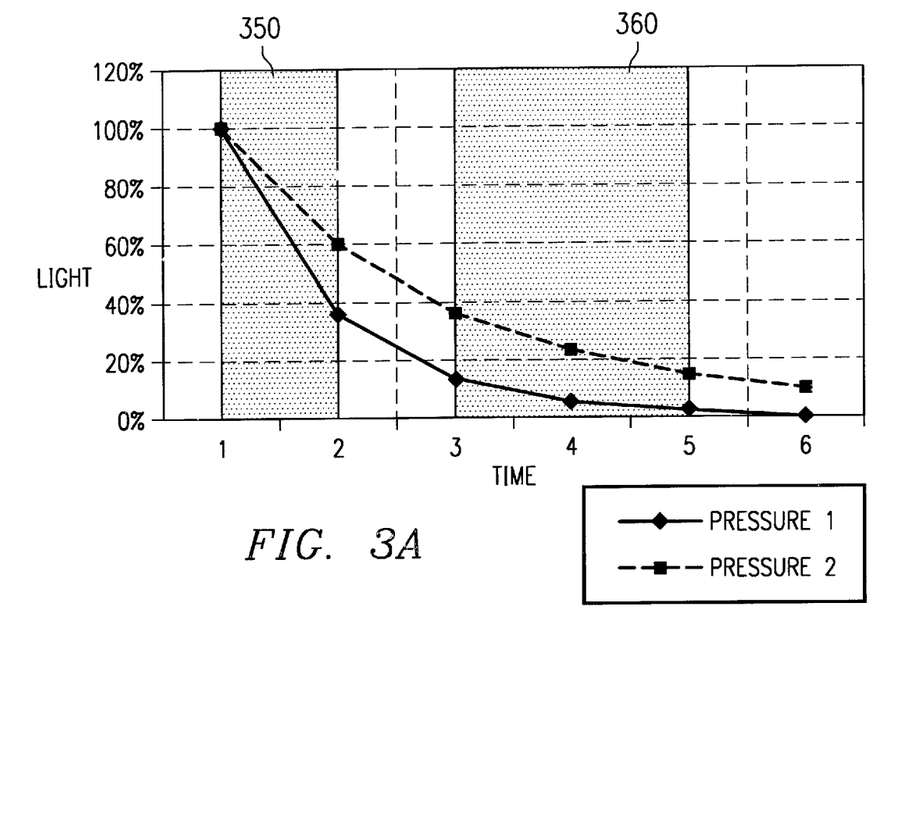
FIG. 3A illustrates two pressure exposure sequences in accordance with the present invention.

Referring now to FIG. 3A there is illustrated two pressure exposure sequences in accordance with the present invention. The light data the camera measures is proportional to the area under the decay curves during the Gate 1 350 and Gate 2 360 periods. From the measured data, the time constant Tau is determined for each of the two pressures. The two Tau's are functions of the two pressures.

Figure 4:
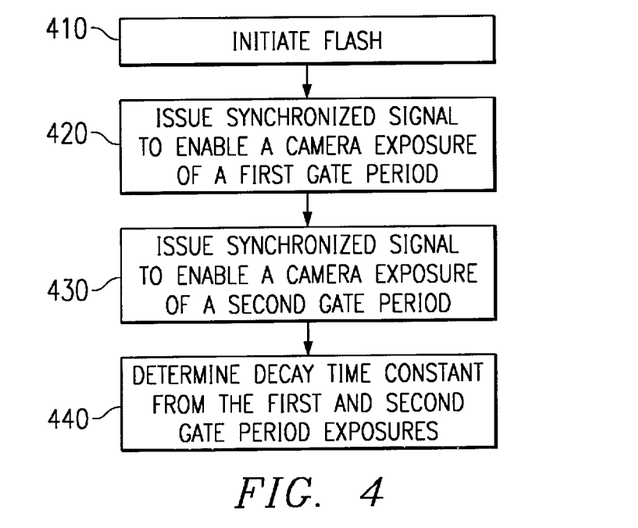
FIG. 4 illustrates a method in accordance with the present invention.

Referring now to FIG. 4 there is illustrated a method in accordance with the present invention. In a first act, a light flash is initiated 410. The light flash is initiated through the PixoMaster 180 by a manual operator command using the PC, for example, or through signaling from other devices. Subsequent to the light flash initiation, a synchronized signal is issued 220 to enable a camera exposure of a first Gate time period (Gate 1). Gate 1 time period follows the period of a flash and in a preferred embodiment may start driving the light flash. Such exposures are repeated many times to build-up a gate 1 picture. Next, a synchronized signal is issued 430 to enable a camera exposure of a second Gate time period (Gate 2). Gate 2 time period follows the Gate 1 time period. Additionally, in a preferred embodiment, the Gate 2 time period is longer than the Gate 1 time period to account for the lower light levels during this latter time period and there is a time lag up to several microseconds between the Gate 1 and Gate 2 time periods. In a preferred embodiment, each of the Gate 1 and Gate 2 exposures include light measurements from at least 100 light flashes. In a final act, a decay time constant is determined 440 from data collected in the Gate 1 and Gate 2 exposures. The determination is computed mathematically by a computer, however, other computing arrangements and devices can be used. The data collected in the Gate 1 and Gate 2 exposures can be stored on the computer or other memory devices for future reference and/or analysis.

Figure 5:
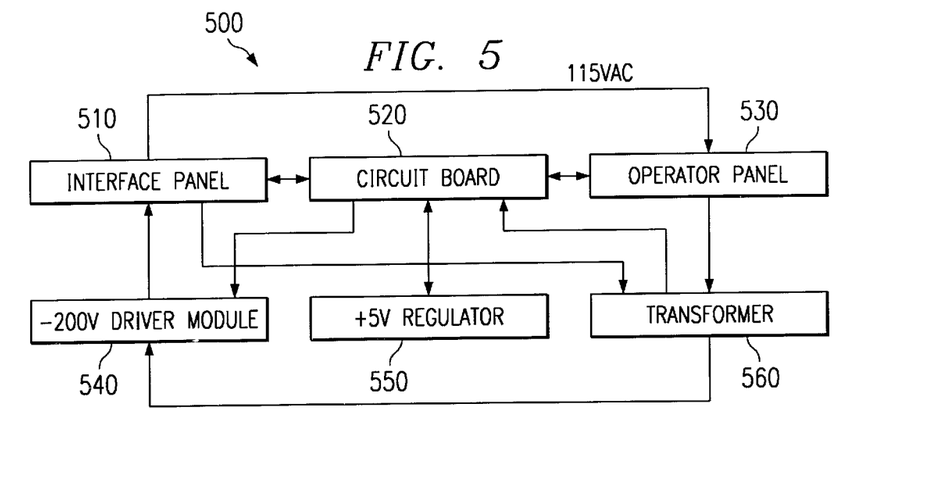
FIG. 5 illustrates an internal interconnect diagram in accordance with the present invention.

Referring now to FIG. 5 there is illustrated a PixoMaster interconnect diagram 500 in accordance with the present invention. Included in the interconnect is an interface panel 510, circuit board 520, operator panel 530, −200 volt driver module 540, 5 volt regulator, and transformer 560.

Figure 6:
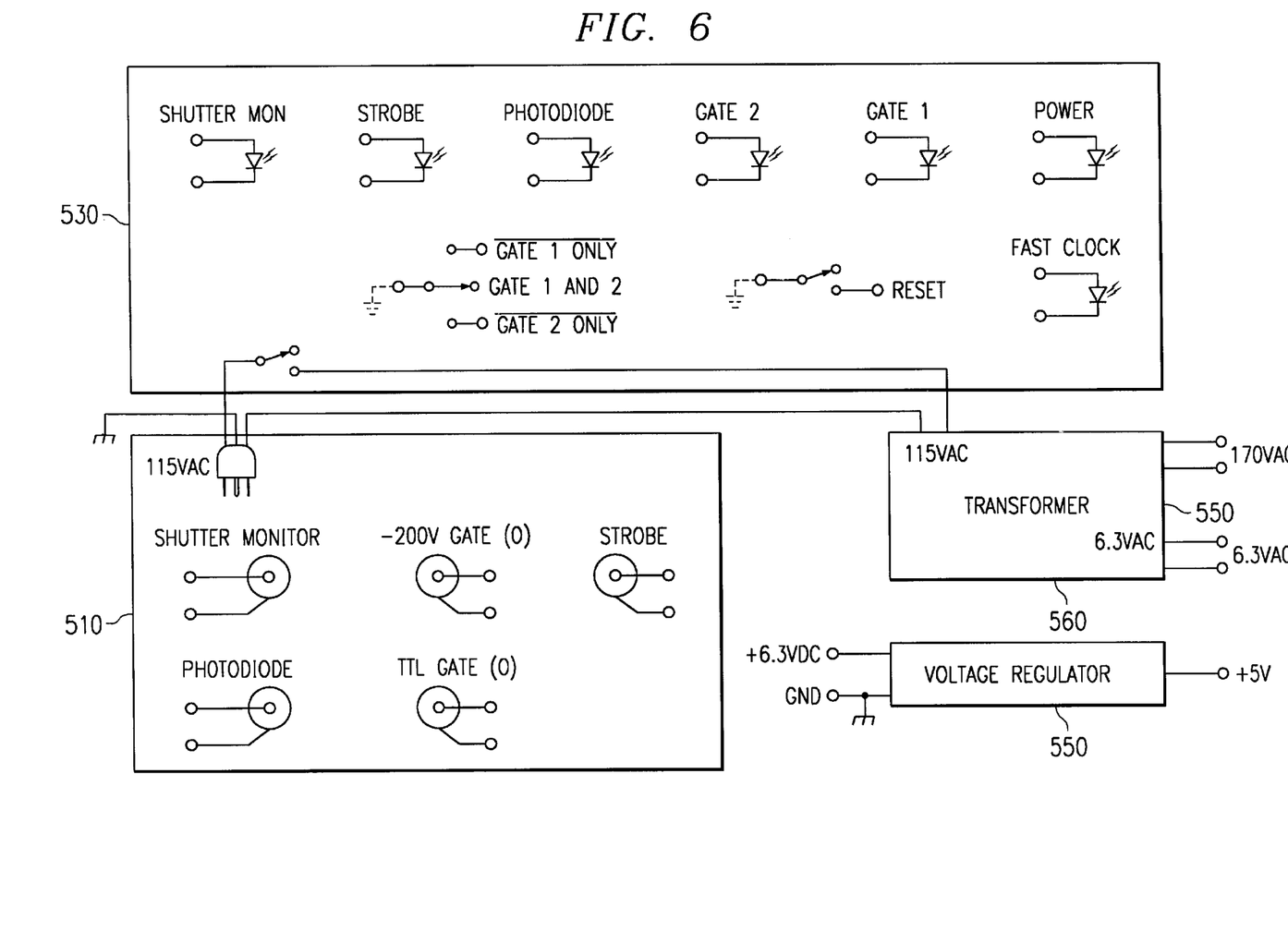
FIG. 6 illustrates a preferred embodiment of an interface/operator/chassis interconnect in accordance with the present invention.

Referring now to FIG. 6 there is illustrated an interface/operator/chassis interconnect in accordance with a preferred embodiment of the present invention. The Interface Panel 510 is a chassis bulkhead, or other interface type device, which includes 5 signal jacks and one power plug. The power plug provides a connection to 115 VAC 3 wire power in a preferred embodiment. The five signals include: 1) a Shutter Monitor input signal which is a Transistor-Transistor-Logic (TTL) signal from the camera controller 160 which starts the acquisition of data; 2) a strobe output signal which is a Transistor-Transistor-Logic (TTL) signal from the PixoMaster 180 which is used to trigger an Xenon flash lamp 110, a Light-Emitting-Diode (LED) array or other flashed light source. The strobe signal controls both the start time and duration of the flashed light; 3) a photodiode input signal which is a Transistor-Transistor-Logic (TTL) signal to the PixoMaster 180 which indicates that the Xenon flash lamp 110 or LED array is flashing; 4) a −200V Gate output signal which is a −200 VDC signal from the PixoMaster 180 which commands the photo intensifier 140 to conduct/intensify light from the camera lens system to the camera body; and 5) a TTL Gate output signal.

In a preferred embodiment, the Operator Panel 530 includes a power on/off switch, a reset switch, and Gate 1 and Gate 2 control switches. The Operator Panel 530 also includes 7 indicator lamps which show PixoMaster 180 operational activities. The indicator lamps include: a shutter monitor signal which indicates that the operator has commanded a camera exposure using a PC 170 interface, for example; a strobe signal which indicates that the PixoMaster 180 is issuing flash commands to the light source 110, LED Array or other flash lamp; a Photodiode signal which indicates that the light source 110 is flashing; Gate 1 and Gate 2 signals which indicates that either a Gate 1 or a Gate 2 exposure is being executed; a power signal which indicate that the PixoMaster 180 is connected to a power source and that the power switch is set to "On"; and a fast clock indicator.

The transformer 560 transforms 115 VAC power to levels required by the 5V Regulator 550. The −200V Driver receives power from a separate DC supply 540. The 5 Volt regulator 550 provides 5 volts DC power for circuit board components.

Figure 7:
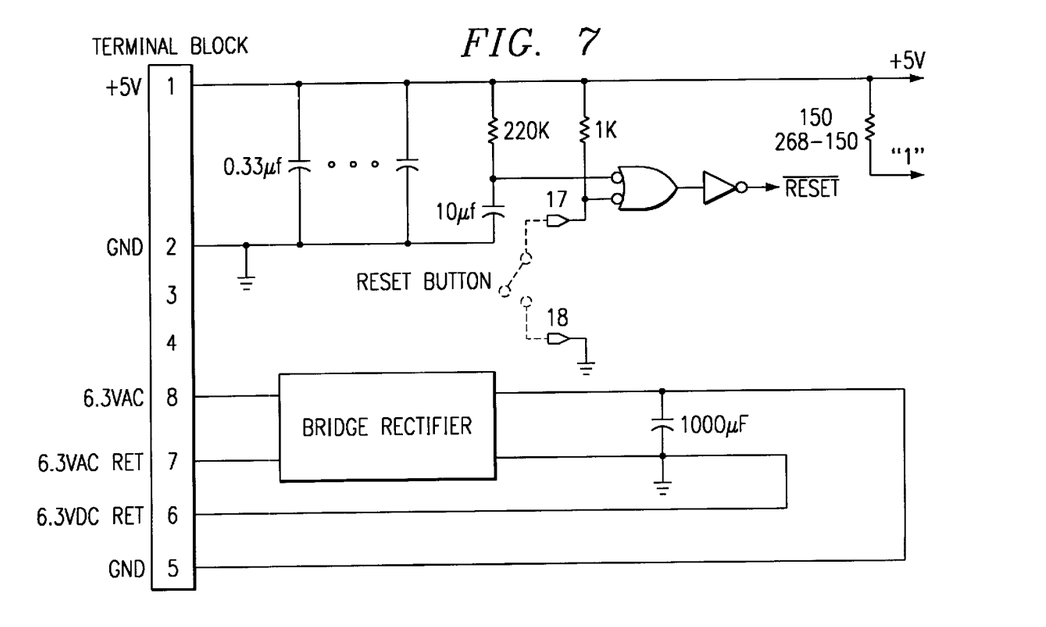
FIG. 7 illustrates a preferred embodiment of a power circuit for a circuit board in accordance with the present invention.
Figure 8:
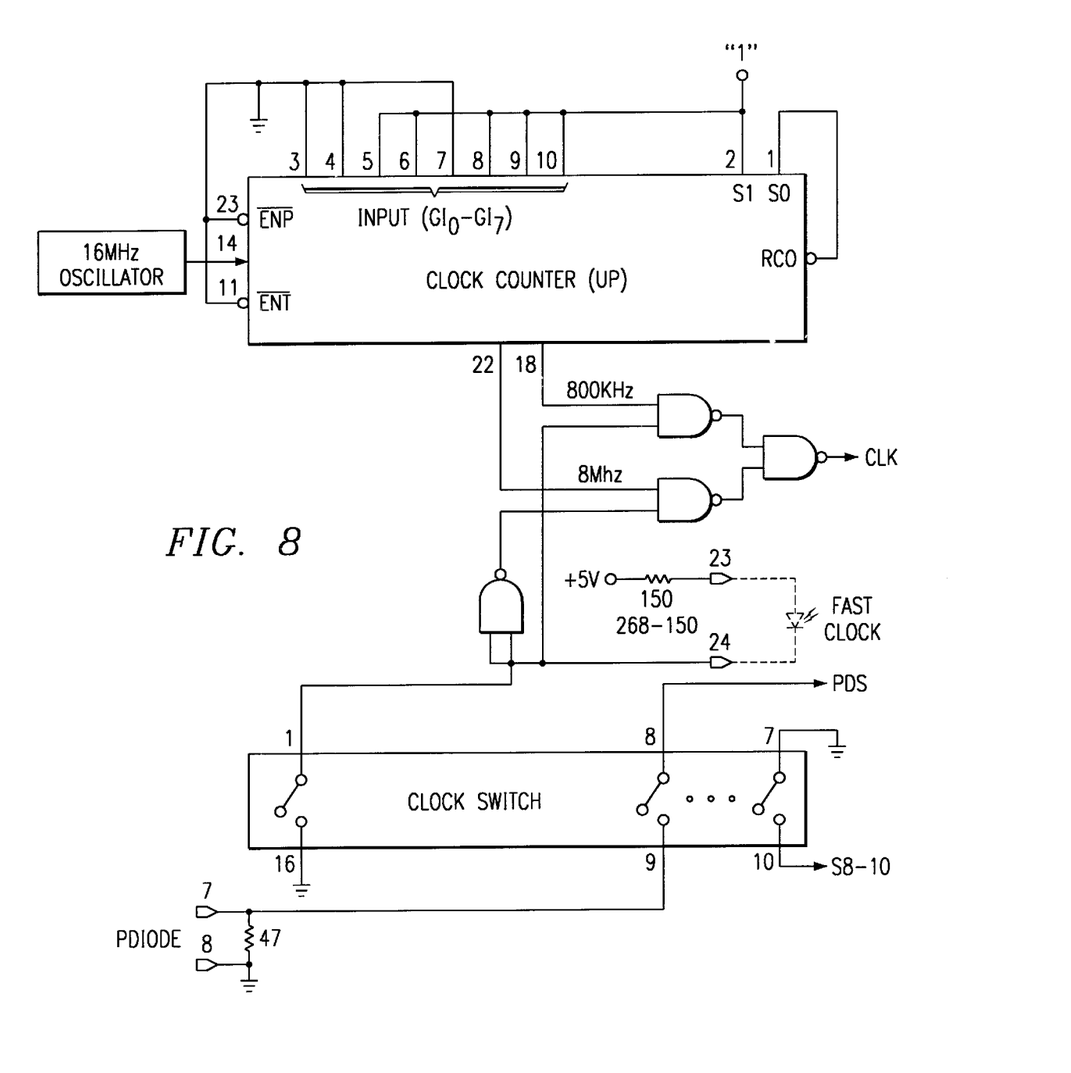
FIG. 8 illustrates a preferred embodiment of a clock generator circuit for a circuit board in accordance with the present invention.
Figure 9:
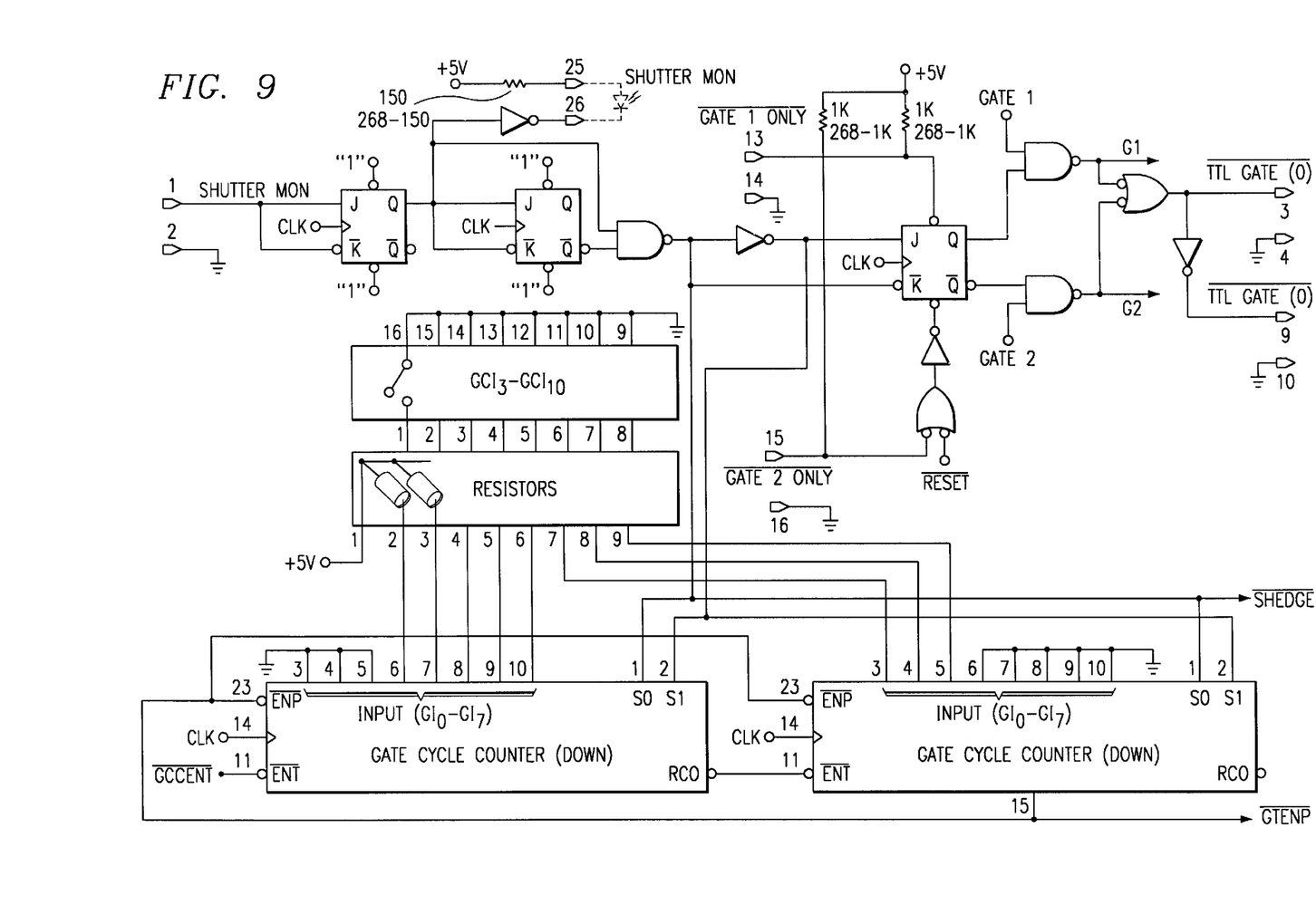
FIG. 9 illustrates a preferred embodiment of a gate cycle counter for a circuit board in accordance with the present invention.
Figure 10:
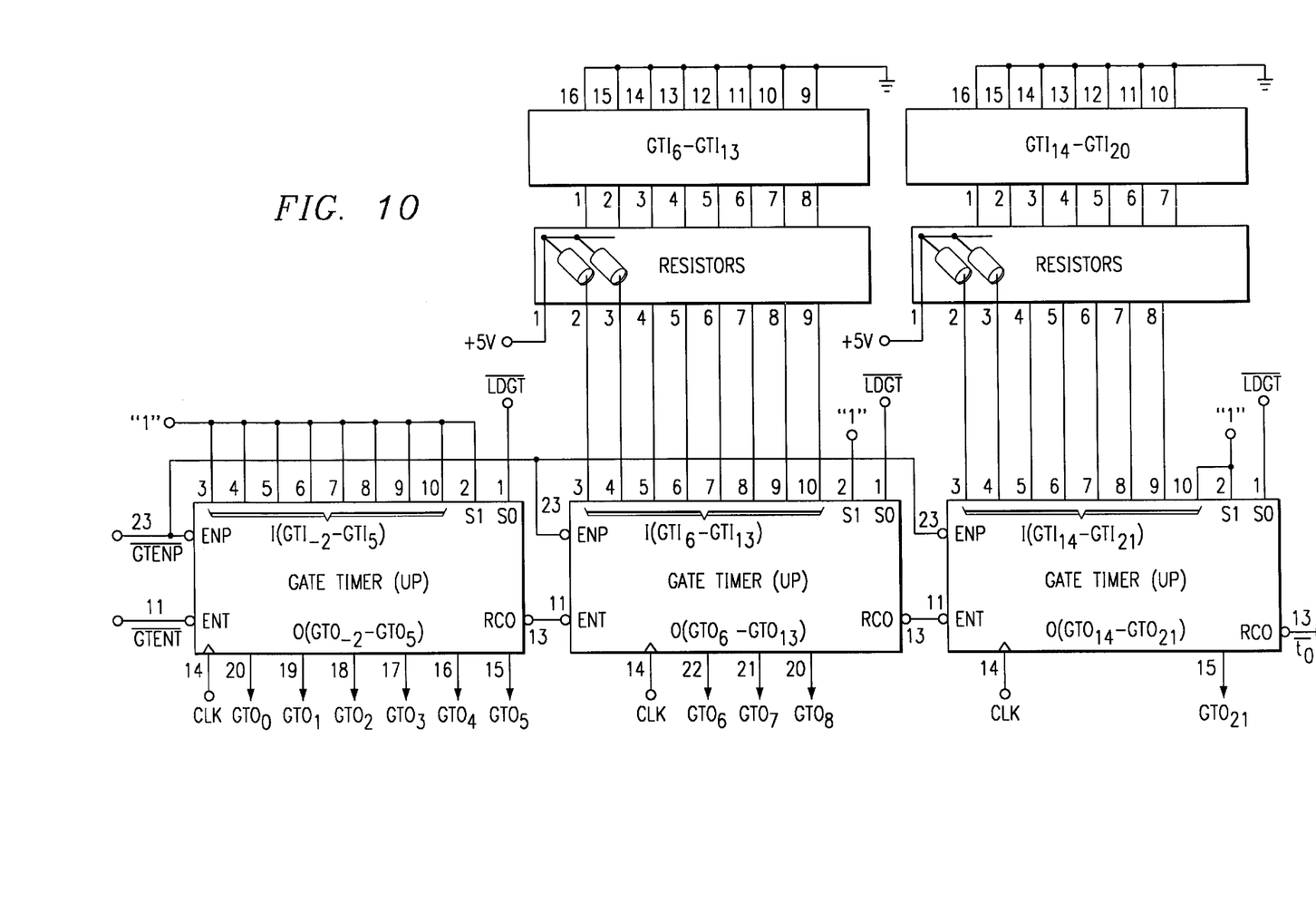
FIG. 10 illustrates a preferred embodiment of a gate timer counter for a circuit board in accordance with the present invention.
Figure 11:
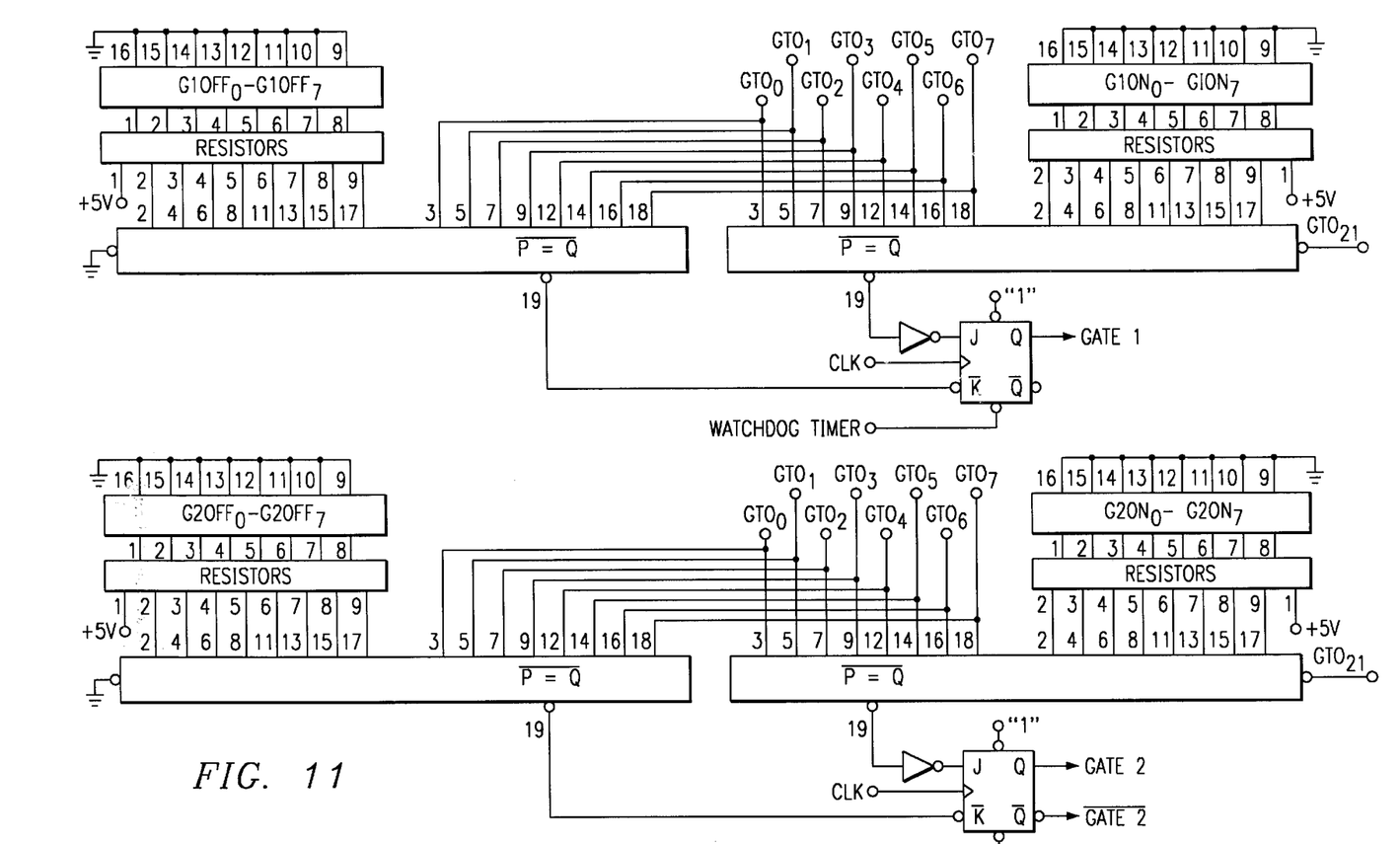
FIG. 11 illustrates a preferred embodiment of gate logic for a circuit board in accordance with the present invention.
Figure 12:
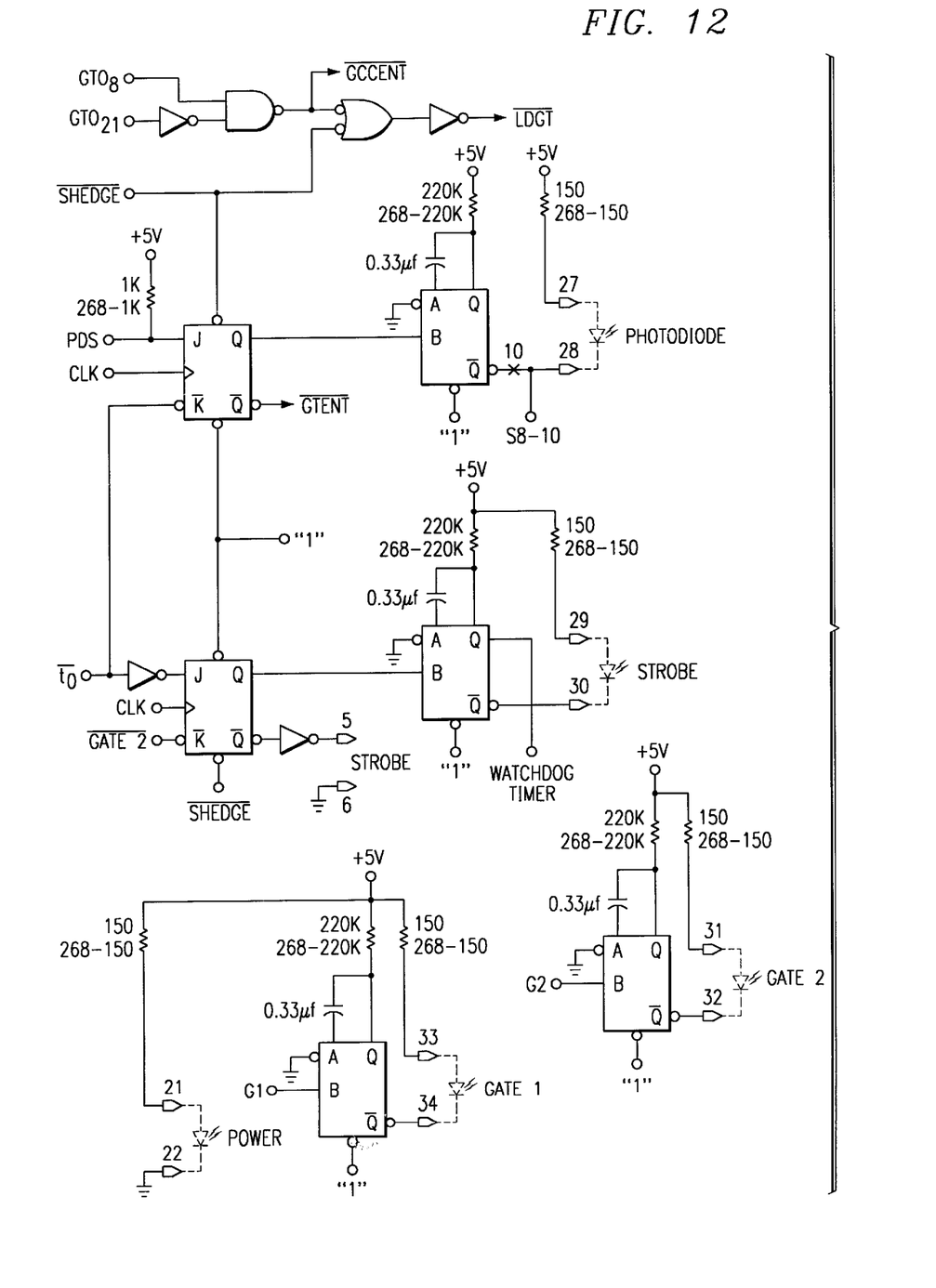
FIG. 12 illustrates a preferred embodiment of miscellaneous logic for a circuit board in accordance with the present invention.

Referring now to FIGS. 7–12 there are illustrated preferred embodiments of circuits included in the Circuit Board 520. The Circuit Board 520 assembly is a printed wiring board that includes integrated circuits and other passive support circuitry as follows: FIG. 7 illustrates a power circuit; FIG. 8 illustrates a clock generator circuit; FIG. 9 illustrates a gate cycle counter circuit; FIG. 10 illustrates gate timer counter circuits; FIG. 11 illustrates gate logic circuits; and FIG. 12 illustrates other miscellaneous circuits. The Circuit Board 520 also includes switch arrays, a terminal board, an interconnect jack and Watchdog Timer circuitry. The Watchdog Timer is a redundant equipment safety feature. If the primary PixoMaster 180 circuitry fails or if there are certain operator errors, the redundant circuitry terminates an exposure before the camera can be damaged.

Figure 13:
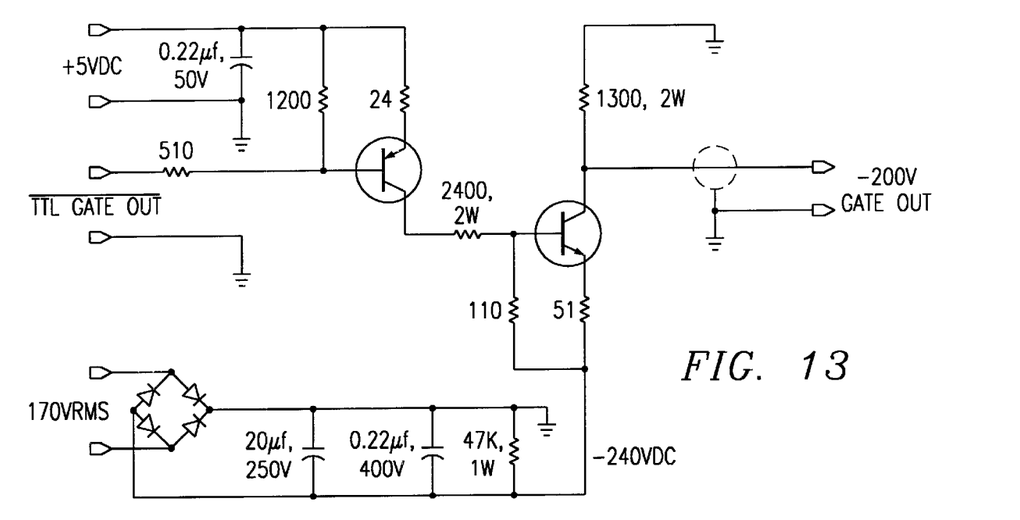
FIG. 13 illustrates a preferred embodiment of a −200 volt gate driver module.

Referring now to FIG. 13 there is illustrated a preferred embodiment of a −200 volt gate driver module 540 in accordance with the present invention. The −200V gate driver module 540 provides an output signal or a −200 VDC signal from the PixoMaster 180 which commands the photo intensifier to conduct/intensify light from the camera lens system to the camera body. For intensifiers requiring 5V TTL gates, such signal is provided at the rear of Pixomaster.

Figure 14:
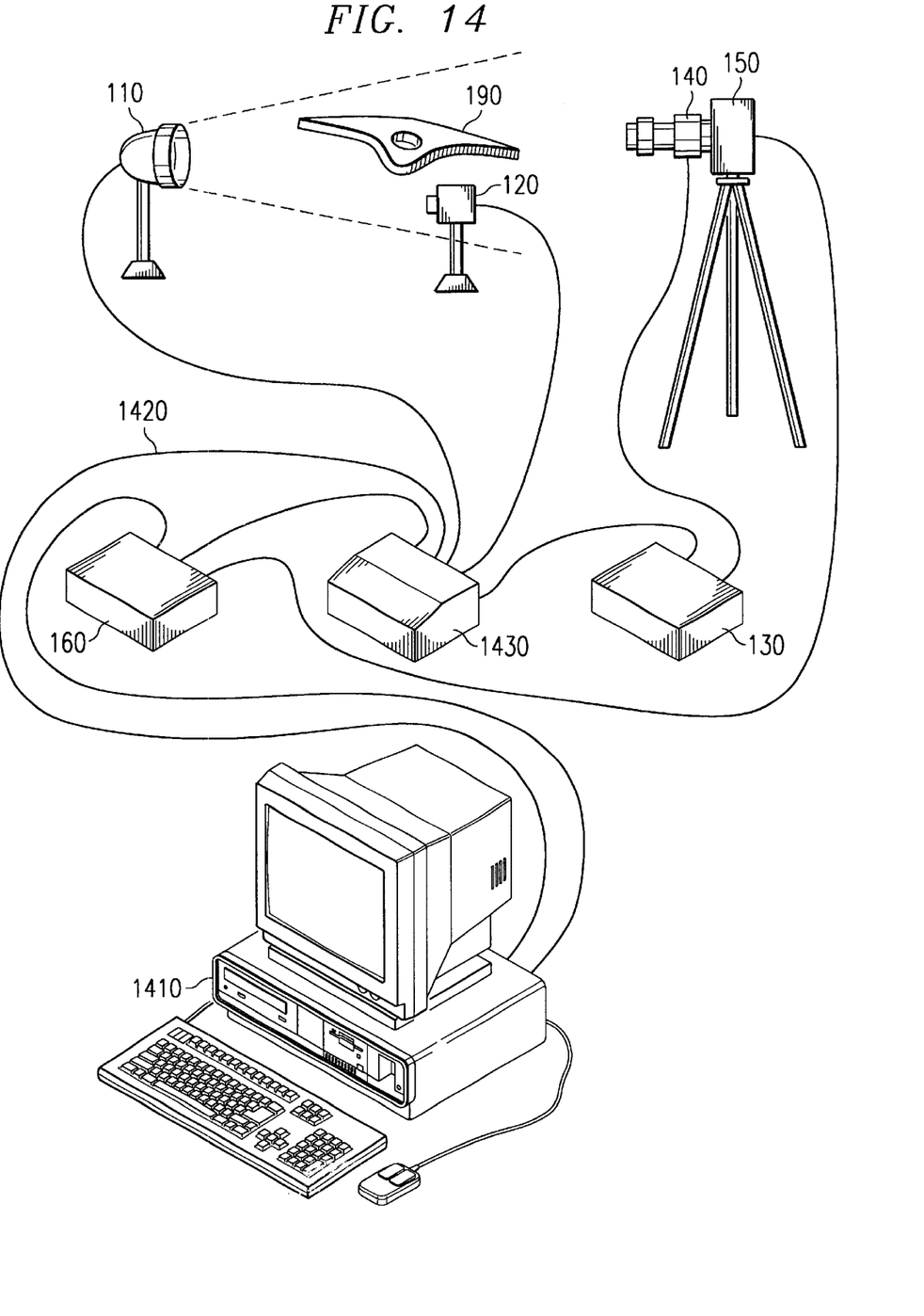
FIG. 14 illustrates a system interconnect diagram in accordance with an embodiment of the present invention.

Referring now to FIG. 14 there is illustrated a system interconnect diagram in accordance with another embodiment of the present invention. The system includes a light source 110, photo detection device 120, photo-intensifier device 140 with associated control 130, and light data collection device 150 with associated controller 160 as aforementioned. The system also includes a computing device such as a computer 1410 or computer system utilizing software for controlling a software driven or controlled synchronizer 1430. The software controlled synchronizer 1430 offers a unique alternative to the above described mechanical switch type gate logic synchronizer.

The computer, computing device, or computer system typically includes hardware capable of executing machine readable instructions, as well as the software for executing acts (typically machine-readable instructions) that produce a desired result. In addition, a computer system may include hybrids of hardware and software, as well as computer sub-systems.

Hardware generally includes processor-capable platforms, such as client-machines (also known as personal computers or servers), and hand-held processing devices (also called personal computing devices (PCDs)), such as smart phones, personal digital assistants (PDAs), or palm devices, for example. Furthermore, hardware typically includes any physical devices that are capable of storing machine-readable instructions, such as memory or other data storage devices. Other forms of hardware include hardware sub-systems, including transfer devices such as modems, modem cards, ports, and port cards, for example. The way hardware is organized within a system is known as the system's architecture (discussed below).

Software includes machine code stored in RAM or ROM, machine code stored on other devices (such as floppy disks, or a CD ROM, for example), and may include executable code, an operating system, as well as source or object code, for example. In addition, software encompasses any set of instructions capable of being executed in a user machine or server—and, in this form, is often called a program or executable code.

Programs often execute in portions of code at a time. These portions of code are sometimes called modules or code-segments. Often, but not always, these code segments are identified by a particular function that they perform. For example, a counting module (or "counting code segment") may monitor the value of a variable. Furthermore, the execution of a code segment or module is sometimes called an act. Accordingly, software may be used to perform a method which comprises acts. In the present discussion, sometimes acts are referred to as steps to help the reader understand the Detailed Description.

Hybrids (combinations of software and hardware) are becoming more common as devices for providing enhanced functionality and performance to computer systems. One hybrid is created when what are traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system and are thus envisioned by the invention as possible equivalent structures and equivalent methods.

Sometimes the methods of the invention may be practiced by placing the invention on a computer-readable medium. Computer-readable mediums include passive data storage, such as a random access memory (RAM) as well as semi-permanent data storage such as a Compact Disk Read Only Memory (CD-ROM), or a compact flash card, for example. In addition, when the invention may be embodied in the RAM of a computer, it may transform a computer or computer system into a new specific computing machine (or devise) or new specific computing system.

The synchronizer 1430 communicates with the computer 1410 through a data bus 1420 or transmission medium, such as coaxial cable, twisted pair wire, or Fiber-optic cable for example. The computer 1410 is used for controlling the strobe frequency or duration and pulse timing of the flash. Additionally, the computer 1410 is used for controlling the gate timing signals of Gate 1 and Gate 2.

Figure 15:
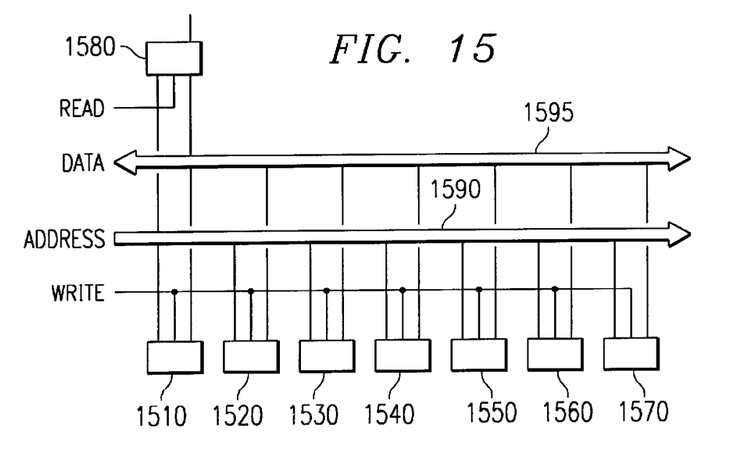
FIG. 15 illustrates a system architecture for a computing device in accordance with an embodiment of the present invention.

Referring now to FIG. 15, there is illustrated a system interconnect diagram for the above-described computer 1410. The system interconnect includes a control register/buffer 1510, strobes register/buffer 1520, frequency register/buffer 1530, Gate 1 on register/buffer 1540, Gate 1 off register/buffer 1550, Gate 2 on register/buffer 1560, Gate 2 off register/buffer 1570, status register/buffer 1580, data bus 1595, and an address bus 1590. In one embodiment, the output devices act as registers to directly control the strobe, frequency and gate timing signals from an auxiliary workstation or computer 1410. In another embodiment, the system interconnect is used to directly output signals to also control the lamps and camera intensifier. In this case, the output devices shown in FIG. 15 act as buffers which receive precisely timed signals from the internal bus, and output transistor-transistor-logic (TTL) signals to the peripheral devices.

Although a preferred embodiment of the apparatus, system and method of the present invention has been illustrated in the accompanied drawings and described in the foregoing detail description, it will be understood that the invention is not limited to the embodiments disclosed, but is capable of numerous rearrangements, modifications, and substitutions without departing from the spirit of the invention as set forth and defined by the following claims.

What is claimed is:

1. An apparatus for determining surface pressure in a pressure sensitive paint system in which a test surface is coated with a pressure sensitive paint that, when flashed with light, exhibits return light with a decay time constant as a function of surface pressure, comprising:

a light source controller enabling a light source to emit a train of light pulses directed at said surface; and a synchronizer having an input for receiving an indication of a detection of said emitted light pulses from a photo sensor and adapted to coordinate a camera exposure for a first gate period and a second gate period responsive to receiving said indication, wherein said first gate period and said second gate period are synchronized with the timing of said detected the light pulses.

2. The apparatus of claim 1 further comprising an operator panel comprising:

a strobe indicator indicating said enabling of said light source to flash;

a flash indicator indicating said light source is flashing; and a gate indicator indicating execution of said first and second gate period exposures.

3. The apparatus of claim 1, wherein said light source comprises at least one of a xenon flash lamp and a light-emitting-diode array and said light pulse indication is received from a photo sensor adapted to sense a light pulse emitted from said at least one of a xenon flash lamp and a light-emitting-diode array.

4. The apparatus of claim 1, wherein said decay time constant is determined from said first and second gate period exposures.

5. The apparatus and claim 1, wherein said synchronizer is further adapted to issue a signal indicating the timing sequence of said first gate period and said second gate period.

6. The apparatus of claim 1, wherein said synchronizer further synchronizes said camera exposure for said first and second gate period and said light source flash, wherein said first gate period is a predetermined time period following said light pulse indication and said second gate period is a predetermined time period subsequent to said first gate period.

7. A system comprising:

a light source adapted to emit a train of light pulses directed at a surface;

a photo sensor having an input for receiving light and adapted to detect said light pulses emitted from said light source and further adapted to output a signal indicative of a light pulse detection;

a camera adapted to collect light level data from light pulses detected by said photo sensor for determining surface pressure of said surface responsive to a synchronization signal; and a synchronizer having an input for receiving said light pulse detection signal from said photo sensor and adapted to output said synchronization signal to said camera for coordinating collection of said light level data for a first gate period and a second gate period responsive to receiving said light pulse detection signal, wherein said first gate period and said second gate period are synchronized with the timing of said detected light pulses.

8. The system of claim 7 further comprising a photo intensifier connected to said camera, said photo intensifier adapted to provide microsecond camera shutter speed and intensify low level light for enabling a plurality of synchronized first gate period and second gate period light level data collections for each camera exposure.

9. The system of claim 7 further comprising a computer adapted to store said light level data and compute a decay time constant from said light level data.

10. The system of claim 7, wherein said first gate period is a predetermined time period immediately following a light pulse and said second gate period is a predetermined time period subsequent to said first gate period.

11. A method comprising the steps of:
  initiating a light source to emit a train of light pulses for reflection from a pressure sensitive surface;
  detecting said light pulses omitted from said light source prior to synchronizing collection of light level data;
  collecting said light level data from said detected light pulses for determining surface pressure of said surface;
  synchronizing said collection of light level data for a first gate period and a second gate period with the timing of said detected light pulses; and
  determining a decay time constant from said light level data collected from said first and second gate periods.

12. The method of claim 11, wherein said decay time constant is a measure of time for a surface brightness of said test surface to decay a predetermined amount and is a function of said surface pressure.

13. The method of claim 11, wherein said light source comprises a xenon flash lamp and a light-emitting-diode array.

14. The method of claim 11 further comprising collecting a plurality of synchronized first gate period and second gate period light level data collections for each camera exposure.

15. The method of claim 11 further comprising the act of setting said light source flash to strobe at least one hundred times per second.

16. The method of claim 11, wherein said camera comprises a digital camera with at least 1024×1024 elements.

17. The method of claim 11 further comprising the act of storing said first and second gate exposures on a computer storage device.

18. The method of claim 17, wherein said act of determining said decay time constant is computed by a computer.

19. The method of claim 11, wherein said first exposure is enabled for a predetermined time period immediately following said light source flash and said second gate exposure is enabled for a predetermined time period subsequent to said first gate exposure time period.

* * * * *